United States Patent Office 3,420,749
Patented Jan. 7, 1969

3,420,749
DISTILLATE SEPARATION OF IRON CONTAMINATED HYDROCARBON CHLORIDES IN THE PRESENCE OF PHOSPHORUS CONTAINING ESTERS
Frederick C. Dehn, New Martinsville, W. Va., assignor to PPG Industries, Inc., a corporation of Pennsylvania
Continuation-in-part of application Ser. No. 489,004, Sept. 21, 1965. This application June 9, 1967, Ser. No. 644,963
U.S. Cl. 203—6   22 Claims
Int. Cl. C23f 14/02; C23f 11/10

ABSTRACT OF THE DISCLOSURE

The distillation of hydrocarbon chlorides containing contaminating quantities of iron is described. An alkyl, aryl or alkyl-aryl ester of phosphoric or phosphorous acid is added to the hydrocarbon chlorides undergoing distillation to prevent fouling of equipment and sludge formation. The esters are added in quantities of about 5 parts by weight per part or iron present. Tricresyl phosphate is disclosed as a preferred material for the practice of the invention.

Figure 1:
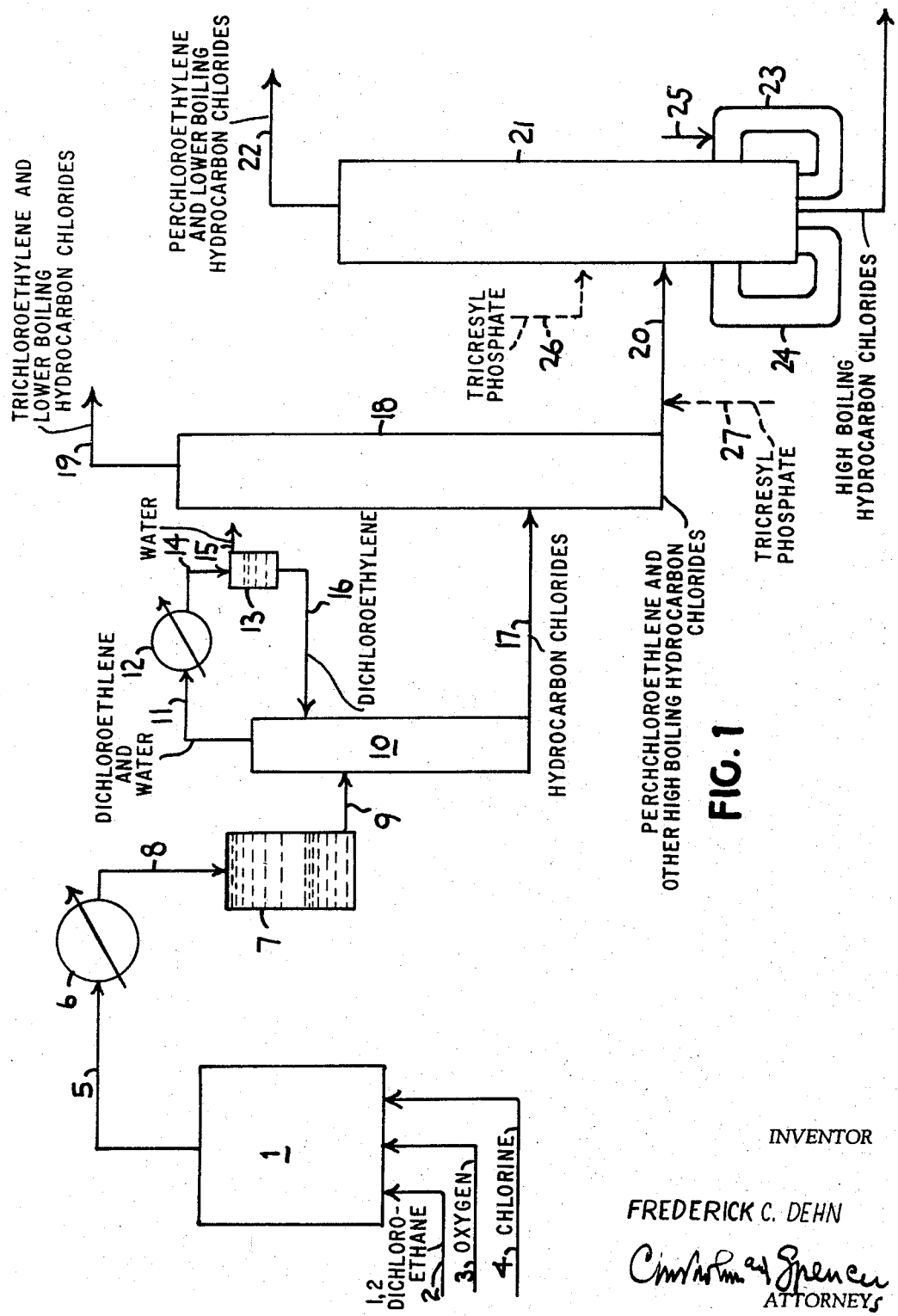

This application is a continuation-in-part of my earlier filed application Ser. No. 489,004, filed Sept. 21, 1965 and now abandoned.

Background of invention

Hydrocarbon chlorides are manufactured by a multiplicity of processes such as thermal and catalytic vapor phase chlorinations, dehydrochlorination, catalytic oxychlorinations, liquid phase chlorinations and other similar processes. The feed materials in these processes typically are hydrocarbons or chlorinated hydrocarbons and the general art indicates both additive chlorination and substitution chlorination to be employed in producing hydrocarbon chloride products.

In the production of hydrocarbon chlorides the recovery of a specific hydrocarbon chloride product or group of hydrocarbon chloride products is normally desired and necessitates processing of crude streams containing hydrocarbon chlorides in dryers, scrubbers, still lines and the auxiliary piping associated therewith. Typically these pieces of equipment are fabricated of metals such as steel, stainless steel, and other structural metal alloys containing iron. While the use of these materials in processing equipment has enjoyed commercial success in chemical plants which process hydrocarbon chlorides, it has led to certain conditions in processing these chlorides that are deleterious. Thus, it has been found that still plates and still reboilers often become fouled with tarry residues and solid carbonaceous materials. Heat exchangers through which hydrocarbon chlorides are passed during processing frequently become coated with tarry residues and sometimes inoperably fouled necessitating shutdown for cleaning and repair. In other instances in still operation involving the overhead production of a given hydrocarbon chloride, contamination of that hydrocarbon chloride with HCl and/or undesired hydrocarbon chlorides occurs. In these instances decomposition of heavy boilers in the still bottoms is believed to cause the production of the undesired HCl and hydrocarbon chloride which evolve overhead and contaminate the product.

It has now been discovered that considerable improvement in the operation of a chemical processing plant manufacturing hydrocarbon chlorides which come in contact with metal surfaces can be realized. Thus, by following the teachings of the instant invention a considerable reduction in the formation of solid carbonaceous impurities, tars and resins in these processing units is readily achieved. Decomposition of heavy boilers in stills giving rise to undesirable by-product formation such as HCl and unwanted hydrocarbon chlorides can also be minimized or avoided. These reductions in carbonaceous impurities and/or decomposition of high boiling hydrocarbon chlorides in still bottoms leads to enhanced still operations.

Description of invention

In accordance with the teachings of this invention hydrocarbon chlorides contacting metal surfaces during manufacture are treated by adding to them a liquid organic ester of phosphorous and/or phosphoric acid. The quantity of ester added is correlated to the metal ion concentration of the hydrocarbon chloride stream to provide at least 1 mole of phosphate per mole of metal present. Generally, on a weight basis this will involve using about 5 parts by weight of the phosphate per part of metal but may be more or less than this depending upon the particular ester employed. Preferably additions of organic phosphate are such that a molar excess of phosphate is used based on the molar amount of metal present, such as 10 to 50 percent or more excess phosphate.

The esters utilized in accordance with this invention are esters of phosphorous and/or phosphoric acid preferably having boiling points at 760 millimeter pressure above about 120° C. preferably above about 200° C. The esters utilized are preferably liquid, although solid esters have been employed with success. The esters of phosphorous and phosphoric acid employed may be alkyl, aryl or mixed alkyl-aryl esters. Mono, di and tri esters of both phosphoric and phosphorous acid may be used in practicing the invention and these esters may comprise alkyl, aryl or mixed alkyl-aryl esters.

Typical of some of the alkyl esters of phosphorus and phosphoric acid contemplated are tris-(2-ethyl hexyl) phosphate, tributyl phosphate, butyl dioctyl phosphate, tri-n-octyl phosphate, trihexyl phosphate, tridecyl phosphate, trioctadecyl phosphate, n-butyl acid phosphate (mixture of monobutyl and dibutyl phosphate), di-n-octadecyl phosphate, di-n-octadecyl phosphite, trimethyl phosphate, diethyl phosphate, triethyl phosphate, triethyl phosphite, diethyl ethyl phosphonate, tri-n-propyl phosphite, dipropyl propylphosphonate and other like material.

Aryl esters of phosphoric and phosphorous acid contemplated typically include materials such as tricresyl phosphate, dicresyl phenyl phosphate, diphenyl cresyl phosphate, triphenyl phosphate, triphenyl phosphite, diphenyl phenyl phosphonate, O-chlorophenyl diphenyl phosphate, bis-(p-tert-butyl phenyl) phenyl phosphate, diphenyl phosphate, triphenyl phosphate and other similar material.

Typical of mixed alkyl-aryl esters of phosphoric and phosphorus acids contemplated are diphenyl, 2-chloroethyl phosphite, diphenyl, 2-chloroethyl phosphonate, didecyl phenyl phosphate, 2-ethyl hexyl diphenyl phosphate and the like material.

In practicing the instant invention it is preferred to employ liquid esters having boiling points above 200° C. for convenience in handling the distillation of hydrocarbon chlorides. Solid esters may be employed however by incorporating them in the hydrocarbon chlorides being distilled. In similar fashion materials having boiling points as low as 120° C. may be successfully employed with hydrocarbon chloride distillation in which the hydrocarbon chloride boils at temperatures considerably below 120° C. (about 30° or more below 120° C.) at atmospheric pressure conditions (760 millimeters of mercury). As an example, during the distillation of trichloroethylene (B.P. 87.2° C.) an ester may be employed which boils above 120° C., though preferably one boiling above 200° C. would be used.

In one embodiment of the instant invention the addition of a liquid organic phosphate ester is made to a hydrocarbon chloride mixture undergoing distillation to separate a "lights" fraction (a low boiling mixture of hydrocarbon chlorides) from a "heavies" fraction (a high boiling mixture of hydrocarbon chlorides). In making separations of this type with mixtures of aliphatic hydrocarbon chlorides containing 1 to 4 carbon atoms it is often found that large quantities of solid carbonaceous impurities form in the still reboiler. Tars and resinous materials resulting probably from polymerization of the hydrocarbon chlorides are also present. These mixtures while undergoing distillation in equipment which is fabricated of steel or alloys containing iron pick up considerable quantities of iron during distillation. In addition these chloride mixtures pick up iron as they contact metal surfaces containing iron during their passage through piping and other auxiliary equipment on their way to the separation still.

Typically in practicing the instant invention in connection with a crude separation distillation procedure of the above type where a cut is being made between two mixtures of hydrocarbon chlorides the material entering the still line is analyzed by conventional procedures for its iron content. Since tar formation as well as the presence of solid carbon and carbonaceous materials appear to be extremely rapid and substantial in amounts in distillations of this type, the organic phosphate ester is added to the streams entering the column in amounts representing at least 1 mole of ester per mole of iron present therein. Usually this quantity of ester will maintain tar and carbonaceous impurity levels at a point that will not necessitate shutdown for reboiler fouling and other similar problems. The ester may be added to the hydrocarbon chloride stream before it enters the column or it may be added at any point in the column. It is preferably added to the column and at a point somewhere between the column midpoint and the bottom. If desired, it can be added to the reboiler section of the column and an effective reduction in normal tars and carbonaceous impurities will be realized.

*Specific embodiments of the invention*

To further illustrate this embodiment of the invention, reference is made to the accompanying drawing, FIGURE 1 which diagrammatically illustrates a train which may be employed in the practice of this embodiment.

As shown in FIGURE 1 a reactor 1 is employed to which is fed ethylene dichloride, oxygen and chlorine through lines 2, 3 and 4, respectively. Reactor 1 contains an oxychlorination catalyst and the reaction is conducted in the manner described in British Patent 904,084. The gases produced by this reaction exit through line 5 and pass through condensing apparatus indicated by the numeral 6. The condensed organics are then passed to the phase separator 7 through line 8.

The organic phase is then passed via line 9 to the still 10. Still 10 is operated to provide a water overhead which conveniently in this instance is an azeotropic mixture of dichloroethylene and water. The material as it boils overhead is removed as vapor in line 11 and passes through a condenser 12. The liquid resulting from the condensation is then passed to a phase separator 13 via line 14. The water phase is discarded through line 15 and the organic phase is returned to the column 10 in line 16 as reflux.

The bottom in column 10 is taken out of the column 10 through line 17 and introduced into column 18. This column is operated at temperatures and pressure to provide an overhead of trichloroethylene and other hydrocarbon chlorides boiling below trichloroethylene. These materials are removed as overhead through line 19 to other stills for further separation and purification.

The bottoms of column 18, which contains perchloroethylene and other high boiling hydrocarbon chlorides such as symmetrical tetrachloroethane, pentachloroethane and the like, are introduced into column 21. In this column the temperatures and pressures are regulated to provide overhead containing perchloroethylene and other materials boiling below 121° C. such as trichloroethane and trichloroethylene. The bottoms in this column are a mixture of higher boiling hydrocarbon chlorides such as pentachloroethane, tetrachloroethane and the like. In the illustrative embodiment of FIGURE 1 the perchloroethylene and other low boiling hydrocarbon chlorides are removed through line 22 and passed to a product still (not shown) for ultimate separation and purification. In the bottom of the column 21 are located arms 23 and 24 of a thermosiphon reboiler. These arms each contain a shell and tube heat exchanger which are steam heated on the shell side to provide heat to the hydrocarbon chlorides which are circulated through the tubes.

In the operation of this type system to produce perchloroethylene and trichloroethylene it has been found that after a period of two months the tubes of the reboiler became so fouled with tarry and resinous material that the heat transfer coefficient was drastically reduced and liquid flow through the tubes impaired to such an extent that cleaning was necessitated. After cleaning, the system was again operated but an analysis of the reboiler liquid content taken to determine iron content. In reference to this analysis a quantity of tricresyl phosphate was added to the reboiler through line 25 representing 10 parts by weight of the iron content thereof. This addition was made on a continuous basis, the calculation being made that the organic stream entering the column contained the quantity of iron measured in the reboiler liquid. Operating in this manner a drastic reduction in tars, resins and carbonaceous solids formation resulted permitting good reboiler flows over several months operation.

In another embodiment of this same system the liquid hydrocarbon chloride in line 20 is analyzed for iron and the tricresyl phosphate is added to the column 21 through dotted line 26. In still a further modification the tricresyl phosphate is added directly to line 20 through dotted line 27. In all instances of course the addition is made so that preferably 10 parts by weight tricresyl phosphate are added per part of iron found in the hydrocarbon chloride analyzed. While tricresyl phosphate was shown with respect to this embodiment the other organic phosphate materials hereinbefore set forth may be employed in lieu thereof or in combination therewith so long as a mole ratio of at least 1 mole of organic phosphate to 1 mole of iron is adhered to.

In another embodiment of the instant invention the addition of organic phosphates to hydrocarbon chlorides undergoing distillation is practiced to avoid contamination of hydrocarbon chloride overhead from stills with hydrogen chloride and undesirable hydrocarbon chloride.

For a more complete understanding of this embodiment, reference is made to FIGURES 2, 3, 4 and 5 which show the application of the invention to three specific systems in which various hydrocarbon chlorides are being produced and which are capable, as a result of the instant invention, of being performed in a much more satisfactory manner.

Figure 2:
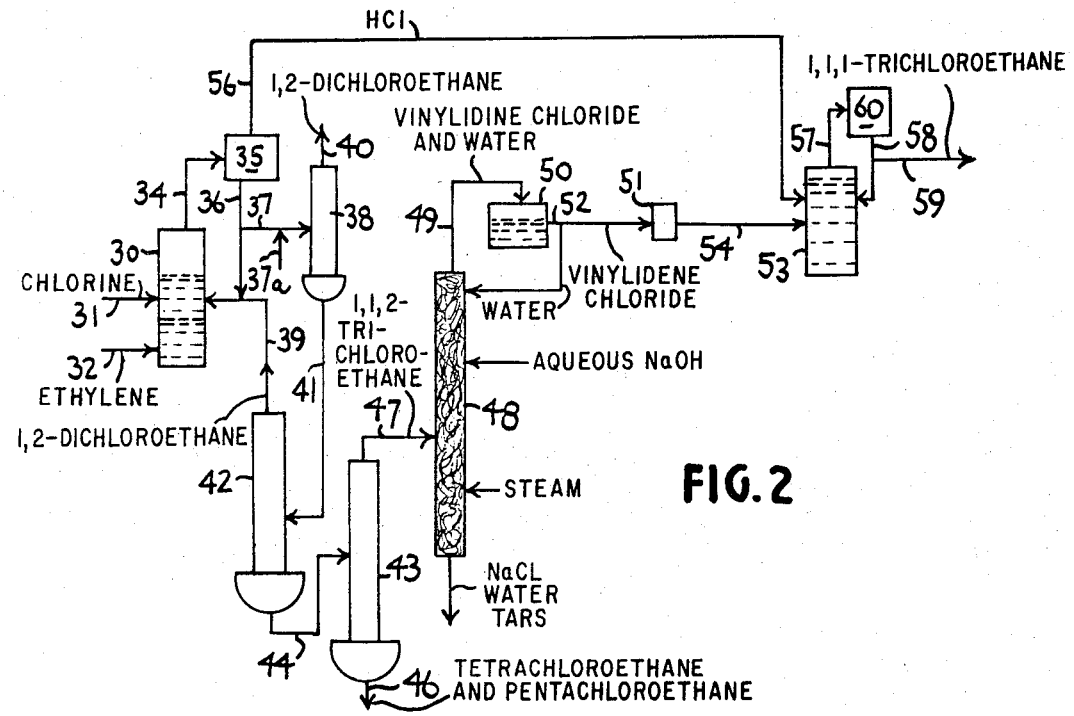

Turning to FIGURE 2 there is shown a diagrammatic illustration of a process train utilized for the production of methyl chloroform. The process utilized to produce the methyl chloroform process is described in detail in U.S. Patent 3,065,280, granted Nov. 20, 1962.

In this patented process chlorine and ethylene are introduced into reactor 30 via lines 31 and 32, respectively and are chlorinated therein in the liquid phase in the presence of a suitable catalyst such as ferric chloride. The organic vapors issuing from the reactor through line 34 are condensed in condenser 35. These organic hydrocarbon chlorides (1,2-dichloroethane, 1,1,2-trichloroethane, tetrachloroethane and pentachloroethane) are passed in part via lines 36 and 37 to still 38. A portion of this liquid is passed via lines 36 and 39 to the reactor 30 to thereby form part of the liquid phase in which the chlorination of ethylene takes place.

In still 38, 1,2-dichloroethane is removed as overhead through line 40 and the bottoms from this still is fed through line 41 to still 42. The bottoms fed to still 42 comprises a small quantity of ethylene dichloride and a preponderant amount of 1,1,2-trichloroethane as well as small amounts of tetrachloroethane and pentachloroethane. In still 42 the 1,2-dichloroethane is removed overhead and is fed to column 30 via line 39. The bottoms from still 42 is passed into still 43 via line 44 where 1,1,2-trichloroethane is removed as overhead in line 47 and the tetrachloroethane and pentachloroethane are removed as bottoms through line 46.

The 1,1,2-trichloroethane fed to column 48 through line 47 is subjected to a dehydrochlorination procedure with caustic soda (NaOH) to produce vinylidene chloride which is removed in line 49 as overhead. The overhead is condensed and passed into a phase separator 50. Water is separated from the vinylidene chloride in separator 50 and the vinylidene chloride is passed into a dryer 51 via line 52 and ultimately enters a hydrochlorinator 53 via line 54.

HCl removed from condenser 35 in line 56 is passed into the hydrochlorinator 53 also. The hydrochlorination takes place in a liquid medium with an appropriate catalyst and the vinylidene chloride is converted to methyl chloroform and is removed from the system via lines 57, 58 and 59. Overhead from the hydrochlorinator 54 is removed via line 57 to a condenser 60 where methyl chloroform is liquefied. A portion of the methyl chloroform is returned to the hydrochlorinator via line 58 to maintain a constant liquid level therein while the balance is sent to product storage in line 59.

While this process is efficacious in producing methyl chloroform some difficulty has been encountered in the operation of the still 43. This still as well as the stills 38 and 42 are steel construction and in the still 43 it has been found that considerable breakdown of tetrachloroethane occurs. This gives rise to contamination of the 1,1,2-trichloroethane overhead product by trichloroethylene. It has been found that this undesirable contamination of the product from this still can be avoided by adding to the still feed a quantity of organic phosphate representing at least 1 mole of organic phosphate or more per mole of iron present in the feed. The addition may be conveniently made via line 37a.

Thus, in a system operated in the manner described in the example of U.S. Patent 3,065,280, it is found that trichloroethylene contamination of product is prevented when 10 parts of tricresyl phosphate by weight are added per part of iron contained in the feed. The tricresyl phosphate is conveniently added to the system in the still pot at the bottom of column 43 but may be added directly to the still feed line 44 or at some other point in the still. The analysis of the still feed can be made from material in line 44 or in the still bottoms or if desired from some intermediate point in the column. With this modification of the process it is now possible to avoid an annoying contamination problem that interfered with the over-all efficiency of the process.

In a further embodiment of the instant invention improvement in methyl chloroform yields can be readily achieved in a process such as described in U.S. Patent 3,059,035, granted Oct. 16, 1962.

Figure 3:
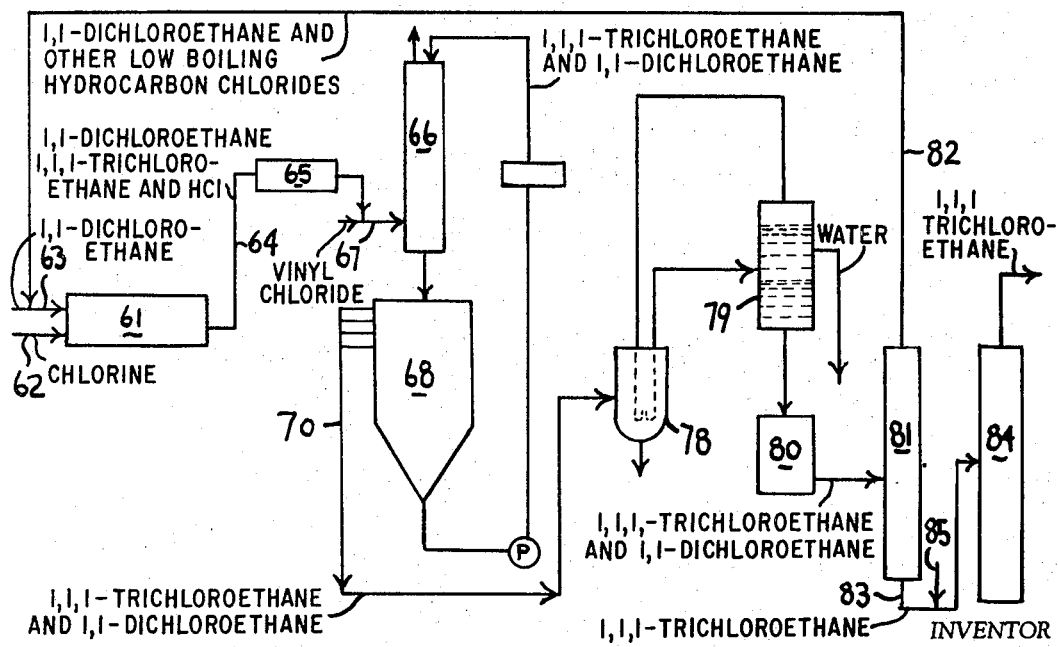

In the process described in this patent and diagrammatically illustrated in FIGURE 3, 1,1-dichloroethane is chlorinated in a reactor 61. Thus chlorine enters the reactor 61 via line 62 and 1,1-dichloroethane is passed into the reactor 61 via line 63. Methyl chloroform and HCl produced by the vapor phase chlorination in reactor 61 are passed via line 64 through heat exchanger 65 and into hydrochlorinator 66. Vinyl chloride is also passed into the hydrochlorinator 66 via line 67. The vinyl chloride reacts with HCl to produce 1,1-dichloroethane.

The liquid product from the hydrochlorinator 66 is passed to a tank 68 from which it is fed via line 70 to a catalyst removal system 78, phase separator 79, dryer 80 and finally into still 81. In still 81, 1,1-dichloroethane is removed as overhead via line 82 and is recycled to reactor 61. Methyl chloroform is removed as bottoms via line 83 and is sent to product still 84 where it undergoes distillation to provide a methyl chloroform product overhead.

In stills 81 and 84 which are conveniently constructed of steel, the methyl chloroform picks up quantities of iron which in the operation of the product still cause the methyl chloroform product to be decomposed by dehydrochlorination to HCl and dichloroethylene. Though this reaction only causes a small loss of product it is undesirable since it causes contamination of product.

By applying the teaching of the instant invention this decomposition reaction can be eliminated and/or greatly minimized thus improving the operation of this process. In applying the present invention to the process of U.S. Patent 3,059,035 the conditions of the process are followed as described in the example of that patent. An analysis of the feed stream passing from still 81 to still 84 is taken to determine iron content. Based upon the iron content of this stream an organic phosphate as described hereinabove is added in amounts of at least 1 mole of organic phosphate per mole of iron present. In the still 84 phosphate addition is conveniently made via line 85 and during distillation when an addition of phosphate on this order is made, the decomposition of methyl chloroform is substantially reduced. The phosphate can be added to the still line feed or to the still at any point therein and will effectively reduce decomposition of product.

In still a further embodiment the present invention has resulted in a substantial reduction in processing costs in the manufacture of 1,2-dichloroethane.

Figure 4:
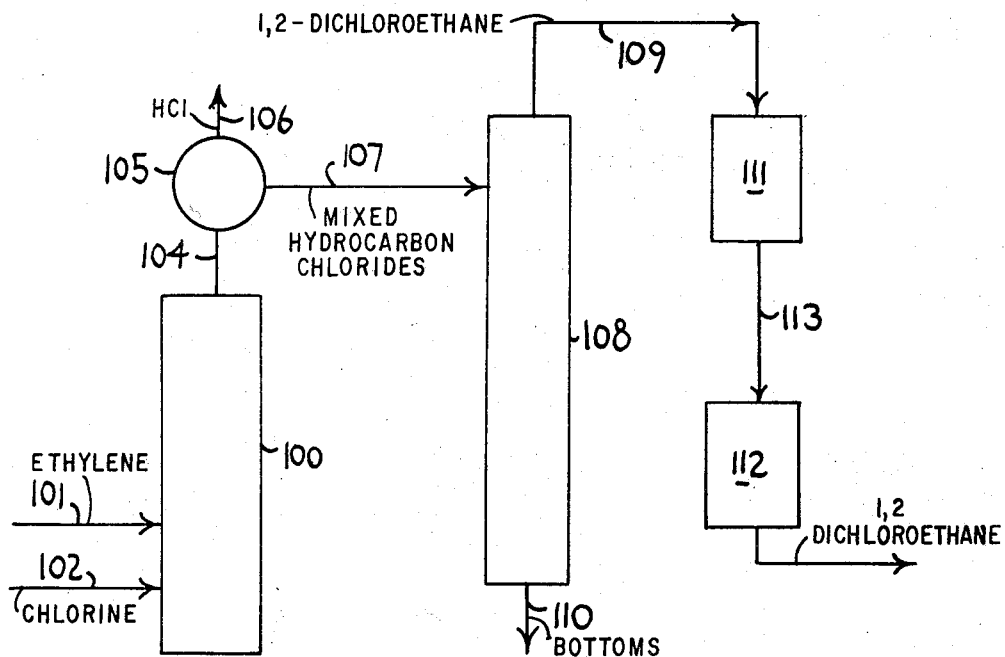

FIGURE 4 shows diagrammatically a process train for the production of 1,2-dichloroethane by a liquid phase chlorination. This process is run in a manner such as is described in U.S. Patent 3,065,280 in column 6, lines 13–35. Thus ethylene and chlorine are fed to a reactor 100 via lines 101 and 102 respectively. The product consisting essentially of 1,2-dichloroethane, 1,1,2-trichloroethane, pentachloroethane, tetrachloroethane and HCl is removed via line 104 and passed through a condenser 105. HCl is passed out of the system via line 106 and the liquid product is fed to still 108 through line 107. In the still 108, 1,2-dichloroethane is removed overhead in line 109, while higher boiling materials are removed via line 110. During distillation it is found that HCl comes off overhead with the product, this being the result of decomposition in the still of higher boiling materials such as tetrachloroethane and pentachloroethane. Since HCl is undesirable in 1,2-dichloroethane product, especially if it is to be stored, the product vapor in line 110 must be passed through a scrubber 111, which may be a water wash or an alkaline wash as desired, and then passed through dryer 112 via line 113. This is necessary in order to remove HCl from the product prior to storage.

Figure 5:
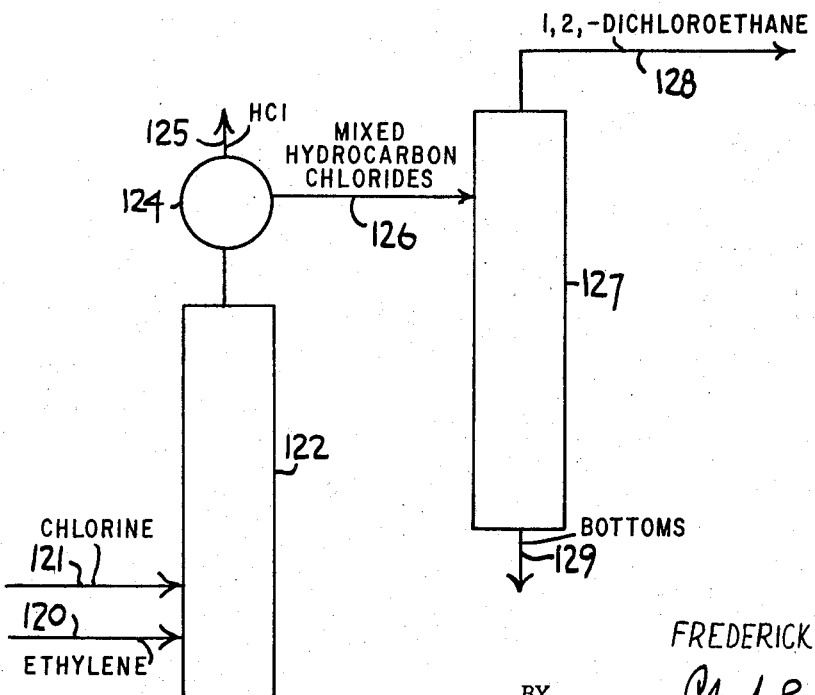

In operating the same reaction as in FIGURE 4 but applying the principles of the present invention, a substantial simplification of the process train can be realized. Thus as seen in FIGURE 5 ethylene and chlorine are fed via lines 120 and 121, respectively to reactor 122. The conditions of reaction are those described in lines 13–35 of column 7 of U.S. Patent 3,065,280. The product is the same as is obtained in the embodiment of FIGURE 4 and it is passed via line 123 through condenser 124. HCl is removed from the system via line 125 and the liquid product is fed via line 126 to the product still 127. The liquid in line 126 is analyzed for iron and tricresyl phosphate is added in an amount sufficient to provide a mole of tricresyl phosphate per mole of iron present. During distillation of liquid hydrocarbon chlorides treated in this manner HCl is virtually eliminated from the 1,2-dichloroethane product coming off line 128. Of course as in FIGURE 4, the higher boiling materials are removed as bottoms via line 129. As can be readily appreciated, the elimination of HCl in the 1,2-dichloroethane overhead from still 127, thus permits the elimination of scrubbers and dryers considerably simplifying the production train and the time required for manufacture of 1,2-dichloroethane product.

This invention as can be readily seen is adaptable in any process designed for the production of hydrocarbon chlorides in which the product streams have been in contact with iron containing surfaces. Thus, processes such as described in U.S. Patents 2,914,576 and 2,952,714 can be modified to include the practice of this invention in the purification stills to eliminate undesirable reactions which might occur during distillation as a result of the presence of iron in the product.

While in the illustrative embodiments hereinabove described tricresyl phosphate, the preferred material for the practice of the invention is utilized, it will be understood that any esters of phosphoric or phosphorous acid may be employed as long as their boiling points are above 120° C. and they are used in the quantities indicated herein. Thus, phosphites, phosphonates and other phosphates may be utilized. Typical materials of the type contemplated have been described hereinbefore.

Thus, while the invention has been described with reference to certain specific illustrated embodiments it is of course understood that it is not intended to be limited thereby except insofar as appears in the accompanying claims.

I claim:
1. A method for reducing sludge formation during distillation comprising:
    (a) adding to a liquid mixture of hydrocarbon chlorides containing contaminating iron ions, an ester of a member of the group consisting of phosphorous acid and phosphoric acid, said ester having a boiling point above about 120° C.;
    (b) regulating the quantity of said ester to provide at least one mole of said ester per mole of iron ions present in said liquid mixture;
    (c) distilling a product containing at least one hydrocarbon chloride from the ester containing liquid mixture; and
    (d) removing said product from the distillation system as an overhead.
2. The method of claim 1 wherein the ester employed is a mono-ester of said member.
3. The method of claim 1 wherein the ester employed is a di-ester of said member.
4. The method of claim 1 wherein the ester employed is a tri-ester of said member.
5. The method of claim 1 wherein said product is a light fraction containing at least one hydrocarbon chloride which has been separated from a heavy fraction containing at least one hydrocarbon chloride.
6. A method for reducing sludge formation during distillation comprising:
    (a) adding to a liquid mixture of hydrocarbon chlorides containing contaminating iron ions, a liquid organic phosphate tri-ester having a boiling point above about 200° C.;
    (b) regulating the quantity of said organic phosphate tri-ester to provide at least one mole of said organic phosphate tri-ester per mole of iron ions present in said liquid mixture;
    (c) distilling a product containing at least one hydrocarbon chloride from the organic phosphate tri-ester containing liquid mixture; and
    (d) removing said product from the distillation system as an overhead.
7. The method of claim 6 wherein the organic phosphate tri-ester added is tricresyl phosphate.
8. A method for reducing sludge formation during distillation comprising:
    (a) adding to a liquid mixture containing methyl chloroform and contaminating iron ions, an organic phosphate tri-ester having a boiling point above about 200° C.;
    (b) regulating the quantity of said organic phosphate tri-ester to provide at least one mole of said organic phosphate tri-ester per mole of iron ions present in said liquid mixture;
    (c) distilling a product rich in methyl chloroform from the organic phosphate tri-ester containing liquid mixture; and
    (d) removing said product from the distillation system as an overhead.
9. The method of claim 8 wherein the organic phosphate tri-ester is tricresyl phosphate.
10. A method for reducing sludge formation during distillation comprising:
    (a) adding to a liquid mixture containing 1,2-dichloroethane, tetrachloroethane and contaminating iron ions, an organic phosphate tri-ester having a boiling point above about 200° C.;
    (b) regulating the quantity of said organic phosphate tri-ester to provide at least one mole of said organic phosphate tri-ester per mole of iron ions present in said liquid mixture;
    (c) distilling a product rich in 1,2-dichloroethane from the organic phosphate tri-ester containing liquid mixture; and
    (d) removing said product from the distillation system as an overhead.
11. The method of claim 10 wherein said organic phosphate tri-ester is tricresyl phosphate.
12. A method of reducing sludge formation during distillation comprising:
    (a) adding to a liquid mixture containing 1,1,2-trichloroethane, higher chlorinated saturated aliphatic hydrocarbons and contaminating iron ions, an organic phosphate tri-ester having a boiling point above about 200° C.;
    (b) regulating the quantity of said organic phosphate tri-ester to provide at least one mole of said organic phosphate tri-ester per mole of iron ions present in said liquid mixture;
    (c) distilling a product rich in 1,1,2-trichloroethane from the organic phosphate tri-ester containing liquid mixture; and
    (d) removing said product from the distillation system as an overhead.
13. The method of claim 12 wherein said chlorinated saturated aliphatic hydrocarbon is tetrachloroethane.
14. The method of claim 12 wherein the organic phosphate tri-ester is tricresyl phosphate.
15. A method for reducing sludge formation during distillation comprising:
    (a) adding to a liquid mixture of hydrocarbon chlorides containing contaminating iron ions, an ester of a member of the group consisting of phosphorous acid and phosphoric acid, said ester having a boiling point above about 200° C.;
    (b) regulating the quantity of said ester to provide at least one mole of said ester per mole of iron ions present in said liquid mixture;
    (c) distilling a product containing at least one hydrocarbon chloride from the ester containing liquid mixture; and
    (d) removing said product from the distillation system as an overhead.
16. The method of claim 15 wherein said ester is a mono-ester of said member.
17. The method of claim 15 wherein said ester is a di-ester of said member.

18. The method fo claim 15 wherein said ester is a tri-ester of said member.

19. A method for reducing sludge formation during distillation comprising:
(a) adding to a liquid mixture of hydrocarbon chlorides containing contaminating iron ions, an ester of a member of the group consisting of phosphorous acid and phosphoric acid, said ester being substantially incapable of boiling off at the boiling point of said hydrocarbon chloride;
(b) regulating the quantity of said ester to provide at least one mole of said ester per mole of iron ions present in said liquid mixture;
(c) distilling a product containing at least one hydrocarbon chloride from the ester containing liquid mixture; and
(d) removing said product from the distillation system as an overhead.

20. The method of claim 19 wherein said ester is a mono-ester of said member.

21. The method of claim 19 wherein said ester is a di-ester of said member.

22. The method of claim 19 wherein said ester is a tri-ester of said member.

References Cited

UNITED STATES PATENTS

| | | | |
|---|---|---|---|
| 2,298,638 | 10/1942 | Prutton | 260—652.5 |
| 2,803,663 | 8/1957 | Kohn | 260—652.5 |
| 2,970,113 | 1/1961 | Bachtel | 260—652.5 |
| 2,996,351 | 8/1961 | Stobe | 203—6 |
| 3,277,120 | 10/1966 | Fullhart et al. | 260—652.5 |

WILBUR L. BASCOMB, JR., *Primary Examiner.*

U.S. Cl. X.R.

203—38, 60, 71; 260—652.5, 652, 654